April 13, 1948. R. A. GAISER ET AL 2,439,654
METHOD OF SILVERING SURFACES
Filed Sept. 18, 1943

Inventor
ROMEY A. GAISER
PAUL T. MATTIMOE
By Frank Fraser
Attorney

Patented Apr. 13, 1948

2,439,654

UNITED STATES PATENT OFFICE 2,439,654

METHOD OF SILVERING SURFACES

Romey A. Gaiser and Paul T. Mattimoe, Toledo, Ohio, assignors to Libbey-Owens-Ford Glass Company, Toledo, Ohio, a corporation of Ohio Application September 18, 1943, Serial No. 502,916

10 Claims. (Cl. 117—47)

The present invention relates to the formation of metallic coatings by chemical reduction, and more particularly to the silvering of materials which have heretofore been difficult or impossible to silver.

Briefly stated, the invention contemplates treating a material of this character, prior to the actual silvering operation, in a manner to form on its surface an extremely thin, transparent film; which film will render the surface of the material receptive to the deposition of a coating of metallic silver by any of the well known silvering methods.

Although definitely not restricted to the treatment of any specific materials, the method of the invention has proven particularly successful for silvering certain plastics which have not been considered susceptible to silvering. For example, polystyrene, polymethyl methacrylate, vinyl chloride-vinyl acetate copolymer, ethyl cellulose, and many others.

There are, of course, some plastics upon which silver coatings can be deposited by the chemical reduction of silver compounds in the same way that glass is silvered, but no satisfactory method has before been developed for silvering plastics of the group including those listed above, and which are characterized by the fact that their surfaces are not wet by water, or by any of the aqueous solutions used in the silvering art; that is, by the silvering solutions, reducing solutions, or so-called sensitizing solutions.

Because of this characteristic, when an attempt is made to silver such plastics by the regular methods, the silver is deposited only in small isolated areas and continuous films of the metal over the entire plastic surface are never obtained. This holds true no matter which of the several types of aqueous silvering solutions, commonly employed for silvering glass, is used. And variations in the composition of these solutions, including the addition to them of materials which reduce surface tension, have little or no effect on the final result.

However, we have discovered that when such non-wettable plastics are exposed, under the proper conditions, to the vapors of certain readily hydrolyzable, volatile halides, such as titanium tetrachloride or silicon tetrachloride or mixtures of the two, a remarkable change in the nature of the plastic surfaces occurs. With the result that the surface can be wet uniformly by any of the solutions ordinarily used in the silvering of glass, and with the further result that the surface becomes receptive to the formation of a continuous reflecting silver film.

It appears probable that this effect is largely due to the formation of a continuous film of amorphous $SiO_2$ or $TiO_2$ on the surface of the plastic. But the indication is that more complex chemical or physical phenomena are also involved, because a pronounced decrease in the wettability of the treated surface takes place if it is allowed to dry off after having once been in contact with water. In any case, the treatment makes possible the silvering of plastics which before the present invention had not been successfully silvered by chemical reduction methods.

Among these are included such well known commercial transparent plastics and so-called glass substitutes as methyl methacrylate polymers and polyvinyl butyryl plastics. In view of the constantly expanding development of plastics of this sort, the practical advantage of being able to satisfactorily silver them will be readily apparent. They are light in weight and non-breakable, they have good optical properties and when properly silvered are valuable in any number of places where other materials are less desirable or entirely unsuitable; for example, as front or rear surfaced mirrors in aircraft, in such scientific instruments as galvanomters; as a basis for the electrical deposition of other metals in electroplating; as electrostatic shields for radios and many other technical uses; as well as for such everyday adaptations as in pocket mirrors, molded buttons for road reflector signs and the like.

In addition to those already set forth above, other objects and advantages of the invention will become more apparent during the course of the following description, when taken in connection with the accompanying drawings.

In the drawings, wherein like numerals are employed to designate like parts throughout the same:

In carrying out the invention, the article to be silvered is first thoroughly cleaned. Loose dust, lint and so forth can be removed by blasting with clean dry air and, if subsequent inspection reveals any grease or dirt on the surface, we prefer to dip the article in a cleaning solution such as a solution of a dialkyl ester of sodium sulfosuccinic acid or the sodium salt of an alkylated aryl sulfonate. This is followed by a wash in running tap water and a thorough rinsing with distilled water, after which all water is blown off with an air gun.

The cleaned article is now ready for filming, but we have discovered that the filming operation can be more readily controlled if the temperature of the plastic surface is somewhat higher than room temperature. For this reason, the plastic article is preferably heated in an oven at a temperature in the range from 50 degrees centigrade to 80 degrees centigrade for several minutes before filming.

Figure 1:
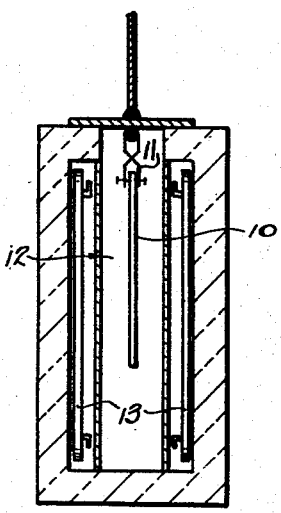
Fig. 1 is a transverse, sectional view through an oven, showing the preheating of a plastic article to be silvered.

This preheating can be carried out in an apparatus as shown in Fig. 1, where the article 10 to be heated is suspended by means of tongs or the like 11 in a chamber 12, heated by electrical resistance elements 13. The preliminary heating step is quite an important one, especially in precision work such as when it is desired to obtain back surface plastic mirrors of exceptionally good optical quality, but it is not essential in all cases. For instance, if the silver deposit is to function as a basis for electrodeposition of metals rather than as a mirror, the preheating may be eliminated.

Figure 2:
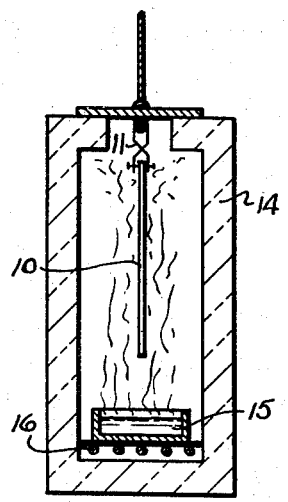
Fig. 2 is a transverse section through a filming chamber within which the article being treated is subjected to the action of the fumes of the volatile, hydrolyzable halide.

The next step is to expose the surface to be treated to the vapors of the volatile halide until a thin transparent film forms thereon. For this purpose, we have employed both the silicon and titanium tetrachlorides with excellent result. About the simplest way in which the filming operation can be performed is illustrated in Fig. 2. A tank or vessel 14 is provided with a quantity of silicon or titanium tetrachloride 15 which can be kept at elevated temperature by means of electrical resistance heaters 16 or the like arranged beneath the vessel 14. We have found that a temperature of around 100 degrees centigrade for the chloride gives good results and, when the article 10 is lowered into the fumes above the liquid 15 under these conditions, the filming operation will be completed in a few seconds.

The film that is formed on the plastic article is essentially the same as the high reflecting film disclosed in the copending application of Romey A. Gaiser, Serial No. 493,358, filed July 3, 1943. The manner in which the film is produced is also substantially the same except that the temperatures used in the filming of plastics, for example, would necessarily be much lower than those described in the Gaiser case for the filming of glass.

Figure 3:
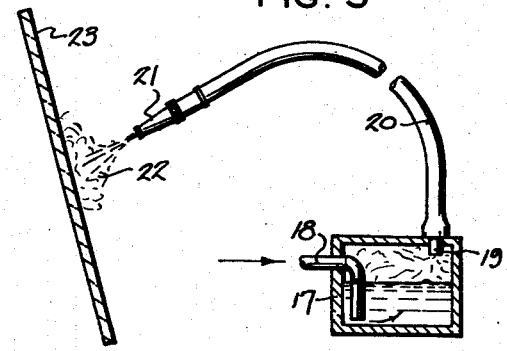
Fig. 3 is a diagrammatic sectional view of a different type of apparatus for subjecting the article to the fumes of the halide.
Figure 4:
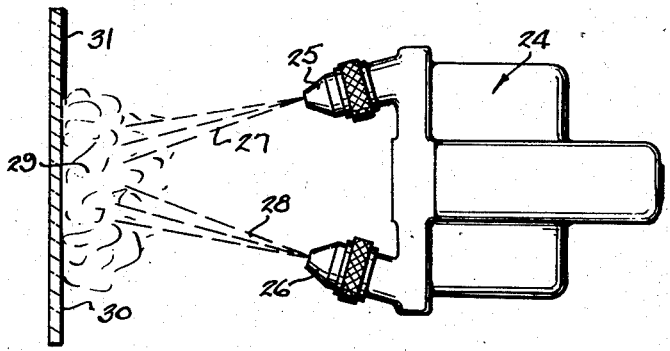
Fig. 4 is a diagrammatic showing of one way in which the silvering solutions can be applied to the treated article.

The article to be filmed can, of course, be exposed to the fumes of the volatile chloride in a number of different ways. One filming apparatus that is particularly well adapted for use in a continuous or semi-continuous method of silvering is shown diagrammatically in Fig. 3. As illustrated, it consists of a closed container 17 for the liquid TiCl₄ or SiCl₄ provided with an inlet tube 18, extending down below the liquid surface, and an outlet tube 19 above the surface of the liquid and connected by means of a flexible hose 20 to a suitable nozzle 21. A compressor or the like (not shown) forces dry air through the tube 18, sweeping fumes of the chloride out through the tube 19 and nozzle 21 which nozzle is used to direct the fumes 22 against the surface 23 to be filmed, so that the fumes will equally affect all parts of the plastic surface.

This can best be accomplished by moving the nozzle 21 first horizontally over the surface and then vertically, somewhat in the manner of spray painting. From two to ten passes over the surface are usually sufficient. In any case it is best to limit the filming to the minimum exposure necessary to bring about subsequent wetting of the surface by water, in order to insure colorless films and the obtaining of final silver coatings having the highest optical qualities.

After being removed from contact with the fumes of the chloride, the filmed surface is immediately washed with distilled water and the presence of the film will cause the surface to be wet uniformly and to tenaciously retain a thin film of water. However, after being once wet the plastic must be kept covered with a film of water throughout the remainder of the process because it is a characteristic of the filmed surface that, if allowed to dry off, it cannot usually be wet uniformly a second time.

If desired, the plastic may next be treated with a very dilute solution of stannous chloride to sensitize its surface. This is preferably done by immersing it in the solution, and then thoroughly rinsing with distilled water. The sensitizing step is not essential to the method, because the filmed material can be satisfactorily silvered without it, but ordinarily speaking we prefer to use it.

The surface of the plastic is now ready for the silvering operation and any of the well known processes used in the silvering of glass is applicable. For example, the spray process, wherein a silver ammonio nitrate solution and a reducing solution therefor are sprayed as independent jets arranged to converge and then be directed upon the surface to be silvered, is very satisfactory and has been illustrated diagrammatically in Fig. 5.

As shown there, the spray gun 24 is of the double jet type, having two nozzles 25 and 26 to spray the silver ammonio nitrate solution 27 and the reducing solution 28 along converging paths, as illustrated, so that the two, combined as a mist 29, will be directed upon the surface 30 to build up a coating of silver 31. In practice, the silver ammonio nitrate solution and reducing solution are contained in separate receptacles (not shown), each being fed to the gun 24 but being kept out of contact with one another until after the sprays issue from the nozzles and mix in the manner illustrated. This spray type of silvering is suitable for all uses and is particularly advantageous in silvering small or irregularly shaped articles, such as safety reflectors. More detailed data on the spraying of metallic silver films may be had by reference to Patent No. 2,214,476, William Peacock, dated September 10, 1940.

The table or pouring methods of silvering, such as the Brashear or the Rochelle-Epsom salts method, may also be used. With these latter methods, after treatment with the dilute stannous chloride, the plastic sheet or article is placed, with the filmed face up, in a shallow tray and the surface is covered with distilled water until the silvering solutions are applied.

Silvering solutions made up according to the Brashear formula are as follows:

*The reducing solution*

| | | |
|---|---|---|
| Distilled water | liter | 1 |
| Granulated sugar | grams | 90 |
| Nitric acid (specific gravity, 1.42) | ml | 4 |

This solution is boiled for five minutes and allowed to cool before using.

*The silver solution*

| | | | |
|---|---|---|---|
| A.— | Distilled water | ml | 400 |
| | Silver nitrate | grams | 20 |
| B.—Ammonium hydroxide (Sp. Gr.) | | ml. (approx.) | 50 |

In preparing the silver solution, part A, the chemicals are added in the order given. The ammonium hydroxide is then added in succesive small portions until the precipitate of silver oxide is almost completely redissolved.

When ready to silver, the distilled water is quickly poured out of the tray and a mixture of one part by volume of the reducing solution and four parts by volume of the silvering solution is poured over the plastic.

After the silver film or coating has been formed on the plastic by any one of the methods described, it should be rinsed with pure water and dried with an air gun. A suitable protective mirror backing such as a coating of shellac or mirror backing paint can then be applied if desired.

When the silvered article is to be electroplated, as in making electrotype molds or to protect the mirrored surface, the silver film should not be allowed to dry off. The article should be immersed in the electroplating bath while still wet, immediately after rinsing the silver film.

Coatings of metallic silver applied in the above manner to non-wettable plastics, or other materials heretofore considered difficult or impossible to silver, will be found to be comparable to the same type of coating deposited on a glass surface, being both adherent, and highly reflective. When the material has been exposed to the chloride vapors while in a heated condition and removed from contact therewith as soon as a film of sufficient thickness is formed, the film on the surface will be transparent and colorless and will have no apparent effect on the optical properties of the material. Consequently, when the coating of metallic silver is deposited on the treated surface, it will give the same effect as though it were deposited on an unfilmed surface.

All of the filming substances that we have thus far tested and found to be satisfactory for our purpose have been volatile, readily hydrolyzable, halides of elements of the fourth group of the periodic table having an atomic weight between 28 and 179.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

We claim:

1. The method of producing a coating of metallic silver on a surface, comprising forming a film on said surface by exposing the surface to the vapors of the tetrachloride of an element of the fourth group of the periodic table having an atomic weight between 28 and 48, and then silvering the filmed surface by subjecting it to the action of a mixture of a silvering solution and a reducing solution in contact therewith.

2. The method of producing a coating of a metal on a surface, comprising exposing said surface to the vapors of titanium tetrachloride, and then depositing a metallic coating thereon by the application of a mixture of a silvering solution and a reducing solution to said surface.

3. The method of producing a coating of metallic silver on a surface, comprising heating said surface, exposing the heated surface to the vapors of titanium tetrachloride to form a transparent film thereon, and then silvering the filmed surface by subjecting it to the action of a mixture of a silvering solution and a reducing solution.

4. The method of producing a coating of metallic silver on a surface, comprising heating said surface, exposing the heated surface to the vapors of titanium tetrachloride to form a transparent film thereon, applying a sensitizing solution of stannous chloride to the filmed surface, and then subjecting the sensitized surface to the action of a silvering solution and a reducing solution in contact therewith.

5. The method of producing a coating of a metal on a surface, comprising exposing said surface to the vapors of silicon tetrachloride, and then depositing a metallic coating thereon by the application of a mixture of a silvering solution and a reducing solution to said surface.

6. The method of producing a coating of metallic silver on a surface, comprising heating said surface, exposing the heated surface to the vapors of silicon tetrachloride to form a transparent film thereon, and then subjecting the filmed surface to the action of a mixture of a silvering solution and a reducing solution.

7. The method of producing a coating of metallic silver on a surface, comprising heating said surface, exposing the heated surface to the vapors of silicon tetrachloride to form a transparent film thereon, applying a sensitizing solution of stannous chloride to the filmed surface, and then subjecting the sensitized surface to the action of a silvering solution and a reducing solution in contact therewith.

8. The method of producing a metallic coating on a synthetic organic plastic surface, comprising exposing said surface to the vapors of the tetrachloride of an element of the fourth group of the periodic table having an atomic weight between 28 and 48, wetting the surface so exposed and forming a coating of metal on the wetted surface by the application of a mixture of a silvering solution and a reducing solution thereto.

9. The method of producing a coating of metallic silver on a surface, comprising heating said surface, exposing the heated surface to the vapors of the tetrachloride of an element of the fourth group of the periodic table having an atomic weight between 28 and 48 until a transparent film is formed thereon, wetting the filmed surface, applying a solution of stannous chloride to said surface to sensitize the same, and then subjecting the sensitized surface to the action of a silvering solution and a reducing solution in contact therewith.

10. The method of treating a surface preparatory to depositing a coating of silver thereon, comprising exposing said surface to the vapors of the tetrachloride of an element of the fourth group of the periodic table having an atomic weight between 28 and 48, wetting said surface, and maintaining it in wetted condition until the silver coating is deposited thereon.

ROMEY A. GAISER.
PAUL T. MATTIMOE.

REFERENCES CITED

The following references are of record in the file of this patent:

UNITED STATES PATENTS

| Number | Name | Date |
|---|---|---|
| 1,941,438 | Kiefer | Dec. 26, 1933 |
| 2,026,086 | Farncomb | Dec. 31, 1935 |
| 2,118,795 | Littleton | May 24, 1938 |
| 2,264,152 | Rowland | Nov. 25, 1941 |
| 2,303,871 | Walker | Dec. 1, 1942 |
| 2,333,534 | Lang | Nov. 2, 1943 |

OTHER REFERENCES

Bulletin Am. Phy. Soc., vol. 14, #2, April 1939, page 24.